US007155478B2

(12) United States Patent
Ims et al.

(10) Patent No.: US 7,155,478 B2
(45) Date of Patent: Dec. 26, 2006

(54) SELECTIVELY HANDLING DATA PROCESSING REQUESTS IN A COMPUTER COMMUNICATIONS NETWORK

(75) Inventors: Steven D. Ims, Apex, NC (US); David B. Lindquist, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 09/971,137

(22) Filed: Oct. 3, 2001

(65) Prior Publication Data

US 2003/0065810 A1 Apr. 3, 2003

(51) Int. Cl.
*G06F 13/00* (2006.01)
(52) U.S. Cl. ..................................... 709/203
(58) Field of Classification Search .............. 709/246, 709/245, 226, 203, 202; 718/100, 102, 104, 718/105
See application file for complete search history.

(56) References Cited

U.S. PATENT DOCUMENTS 6,185,598 B1 * 2/2001 Farber et al. ............... 709/200
6,389,462 B1 * 5/2002 Cohen et al. ............... 709/218

OTHER PUBLICATIONS

*WebSphere Edge Server*, IBM Software, <http://www-4.ibm.com/software/webservers/edgeserver/index.html>, (Aug. 30, 2001).
Schroepfer, Andrew M. *Tier 1 Research, Infostructure For Infrastructure Investors*, (Jun. 12, 2001).
Moore, Cathleen, *CTO Forum: Apps On Tap Model To Thrive Despite Challenges*, InfoWorld, Jun. 21, 2001, <http://www2.infoworld.com/articles/hn/xml/01/06/21/010621hnctoapps.xml?Template=/storyp..>(Aug. 29, 2001).
Kumar, Vishesh, *Betting On A Power Play*, The Industry Standard, Jul. 16, 2001, <http://www.thestandard.com/article/0,1902,27959,00.html>(Aug. 29, 2001).
Boyd, Jade, *Apps Next For Distributed Processing*, Internet Week, Jun. 19, 2001, <http://www.internetwk.com/story/INW20010619S0003> (Aug. 29, 2001).
*ESI—Accelerating E-Business Applications*, <http://www.esi.org>(Aug. 29, 2001).
*ESI—Accelerating E-Business Applications: Edge Architecture Specification*, <http://www.esi.org/architecture_spec_1-0.html>(Aug. 29, 2001).
*Edge Side Includes(ESI) Is Published As A W3C Note*, <http://www.si.org/press80601.html>(Aug. 29, 2001).

* cited by examiner

*Primary Examiner*—Robert B. Harrell
(74) *Attorney, Agent, or Firm*—Jeanine Ray-Yarletts, Esq.; Steven M. Greenberg, Esq.; Carey, Rodriguez, Greenberg & Paul, LLP

(57) ABSTRACT

A system and method for selectively handling requests for dynamic data processing. In the system and method, requests for dynamic data processing can be received in an origin server, but the dynamic data processing can be deferred to an edge server in those circumstances where it is dynamically determined that the edge server is capable of performing such dynamic data processing. In this way, network transmission latencies can be avoided by performing dynamic data processing in those edge servers closest to the requesting user.

16 Claims, 3 Drawing Sheets

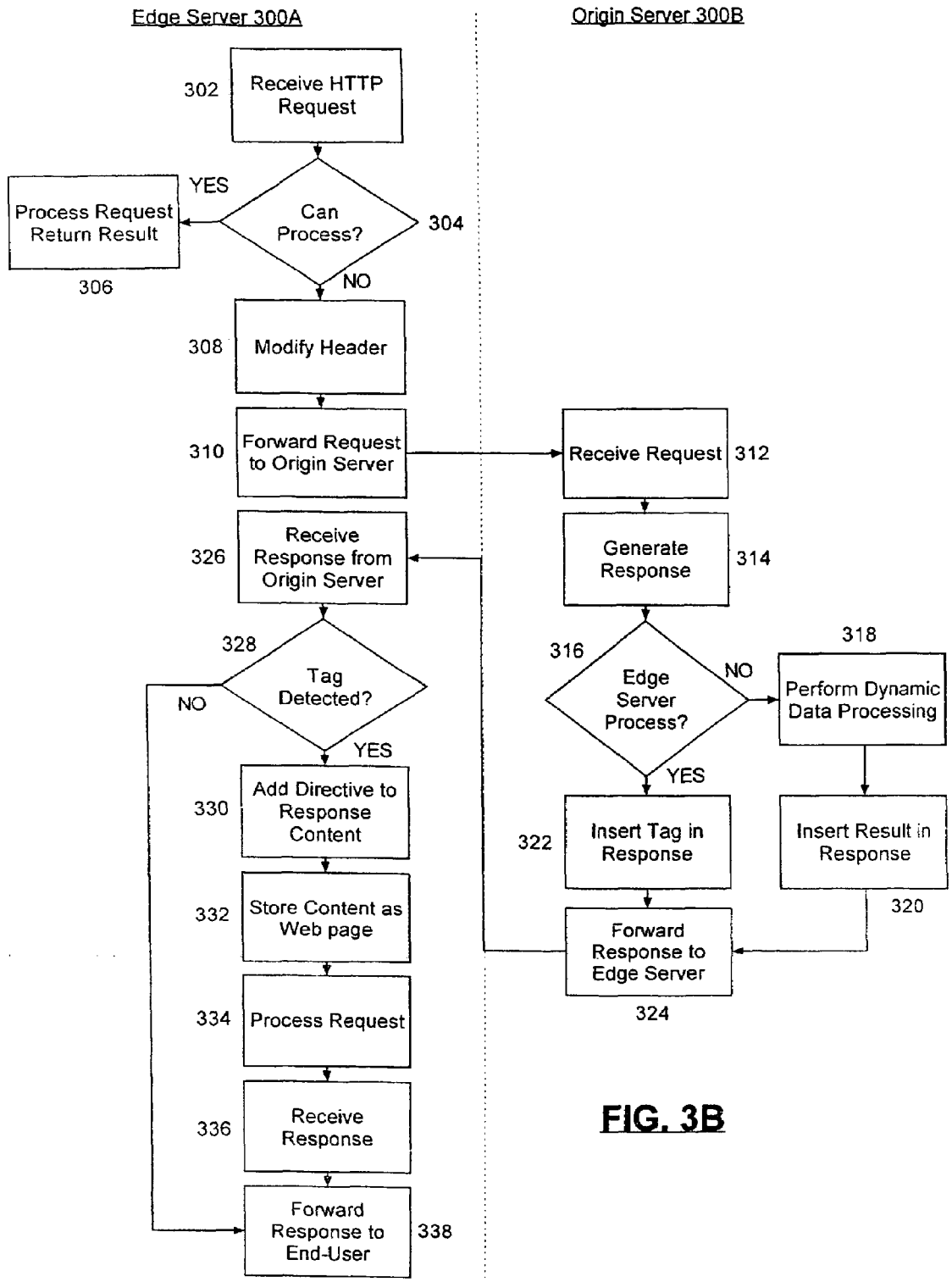

SELECTIVELY HANDLING DATA PROCESSING REQUESTS IN A COMPUTER COMMUNICATIONS NETWORK

BACKGROUND OF THE INVENTION

1. Statement of the Technical Field

The present invention relates to the edge processing of Web content and more particularly to edge processing dynamically generated Web content.

2. Description of the Related Art

As business organizations deploy important business applications over the Internet, challenges arise in the form of processing delays and network latencies. Specifically, the placement of application content in a centralized server can compel users' requests to traverse multiple congested networks in an attempt to effectively interact with the application. In consequence, this centralized approach to deploying applications on the Internet can hinder the attainment of scalability, reliability and performance levels that are considered "mission-critical" in the deployment of a business application.

In view of these challenges, and further in view of the business importance of delivering requested content to end users as quickly as possible, the general problem of reducing response time has received significant attention recently. Most proposed solutions have focused upon accelerating the delivery of static content through distributed caching. An example of such distributed caching includes the WebSphere™ Edge Server™ manufactured by International Business Machines Corporation of Armonk, N.Y. Other proposed solutions involve the use of a content distribution network (CDN) such as the CDN deployed by Akamai Technologies of Cambridge, Mass.

The use of optimized delivery mechanisms for static content has become less significant in recent years, however, as content distributed over the Internet has become increasingly "personalized." More particularly, in order to attract and retain "eye-balls", businesses include within their on-line applications, content which is dynamically tailored to particular end-users. As a result, because this type of content can vary from user to user, this type of content cannot easily be cached. Hence, the latencies previously associated with the challenges of static content remain a problem for dynamically generated content.

Technologies intended to improve the delivery of dynamic content over the Internet have begun to emerge. As an example, International Business Machines Corporation now includes an "application off-load" feature in the Edge Server™ product. The application off-load feature extends the WebSphere™ platform to the edge of the network, enabling unprecedented availability, scalability, and performance for sophisticated e business applications.

By comparison, Ejasent, Inc. of Mountain View, Calif. provides the UpScale™ service which targets customers who have "lumpy" amounts of Web traffic. Specifically, the UpScale service involves first copying an entire application stack, associated data and content for a Web site into a single file. Once the single file has been created, the file can be uploaded to a hub. The hub, in turn, can distribute the single file to various servers at the edge of the network close to the end-user (edge servers). Upon receiving a user request, a participating server can load the application from the single file for processing without requiring the request to be processed centrally in a central application server (origin server).

Notably, as will be apparent to one skilled in the art, both the Edge Server and UpScale products encourage developers to create applications as components which then may be vertically distributed. Components are "deployed" a priori to distributed computers via an out-of-band mechanism. In contrast, the emerging Edge Side Includes (ESI) technology, addresses dynamic content all the while remaining flexible in that ESI does not require a priori deployment of application components. Rather, ESI technology enables the distributed assembly of Web pages from templates and fragments.

Using ESI, an edge server close to an end user fields a page request, forwarding to an origin server only the requests for individual fragments of data that require processing or updating. These individual data fragments are then returned to the local edge server, where the fragments are re-assembled alongside cached and unexpired updateable elements. Subsequently, a Web page can be generated. In consequence, much of the burden of processing and generating an entire application page or Web page is lifted from the origin server while the final generation of the page can be performed in the edge server. Still, despite the flexibility of ESI technology, ESI technology remains a fixed function solution. As a result, the entire infrastructure must be modified in order to introduce new functionality.

SUMMARY OF THE INVENTION

The present invention addresses the deficiencies of the prior art by providing a method and system for selectively handling data processing requests in a computer communications network such as the Internet. Specifically, in the present invention, requests for dynamic data processing can be received in an origin server, but the dynamic data processing can be deferred to an edge server in those circumstances where it is dynamically determined that the edge server has been configured to perform such dynamic data processing. In this way, network transmission latencies can be avoided by performing dynamic data processing in those edge servers closest to the requesting user.

In one aspect of the invention, a method for selectively handling data processing requests in a computer communications network can include identifying at least one type of dynamic data processing which can be performed in an edge server and detecting at least one request for dynamic data processing in network distributable markup. Subsequently, it can be determined whether the edge server can perform the requested dynamic data processing based upon the identified types of dynamic data processing which can be performed in the edge server. If it is determined that the edge server can perform the requested dynamic data processing, processing of the request can be deferred to an edge server.

Notably, for each of the requests, if it is determined that the dynamic data processing can be performed in the edge server, the following steps can be performed. First, markup can be generated which contains the request for dynamic data processing. Subsequently, the markup can be encapsulated in a response. Finally, the response can be forwarded to the edge server, wherein the edge server can perform the deferred processing.

In contrast, for each of the requests, if it is determined that the dynamic data processing cannot be performed in the edge server, the following steps can be performed. First, the data processing can be performed in the origin server thereby producing a result. Subsequently, markup can be generated which contains the result. The markup can be encapsulated in a response and forwarded to the edge server, wherein the edge server can relay the response to a requesting user.

In another aspect of the invention, a method for selectively handling data processing requests in a computer communications network can include configuring a tag handler to perform dynamic data processing, and further configuring a tag handler to identify whether a specified edge server can perform the dynamic data processing. Also, a tag definition can be established in a tag definition file, which tag definition can be associated with the tag handler. Finally, references to the tag definition and the tag handler can be embedded in network distributable markup. In consequence, an origin server processing the markup can locate the tag handler based upon the tag definition. From the tag handler, the origin server can determine whether to defer processing of a data processing request to a specified edge server or whether to process the request locally in the origin server.

As an example, in a very particular aspect of the invention, a method for selectively handling data processing requests in a computer communications network can include the following steps: First, a hypertext transfer protocol (HTTP) request for a Java Server Page (JSP) can be received in an edge server. The HTTP request can include an HTTP request header. Second, the HTTP request header can be modified to indicate whether the edge server can process JSP program fragments having particular markup tags.

Third, the HTTP request including the modified HTTP request header can be forwarded to an origin server. Fourth, the origin server can process the HTTP request by executing the requested JSP. The origin server, however, can defer processing any JSP program fragments in the JSP having the particular markup tags. Subsequently, the origin server can return the requested JSP to the edge server. Finally, the deferred JSP program fragments can be processed in the edge server.

A system for selectively processing a request for dynamic data processing in a computer communications network can include a tag handler library, a tag definition file, an application processor, and deferred processing logic configured to modify a request header to specify which types of dynamic data processing the system can process. Notably, the tag handler library can include one or more tag handlers configured to perform dynamic data processing. Likewise, the tag definition file can include one or more tag definitions, each tag definition associating a tag handler with a particular markup language tag.

The application processor can be configured to process markup and to invoke tag handlers corresponding to particular markup language tags detected in the markup as specified by tag definitions in the tag definition file. Finally, the deferred processing logic can be further configured to pre-process markup for processing in the application processor. In one particular aspect of the invention, the tag handler can be one or more Java classes. As such, the markup can be a Java Server Page (JSP) and the markup language tag can be a customized JSP tag.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a cost-effective mechanism for reducing timing latencies associated with requests for network distributable content which can include dynamically generated data. Specifically, in one aspect of the present invention, a transparent process is taught by which portions of dynamic Web pages may be partially processed in and transferred from an origin server and subsequently processed in an edge server. Notably, while computers which centrally host application and network distributable content are often referred to as "origin servers", those computers which are closest to end-users are often referred to as "edge servers".

Figure 1:
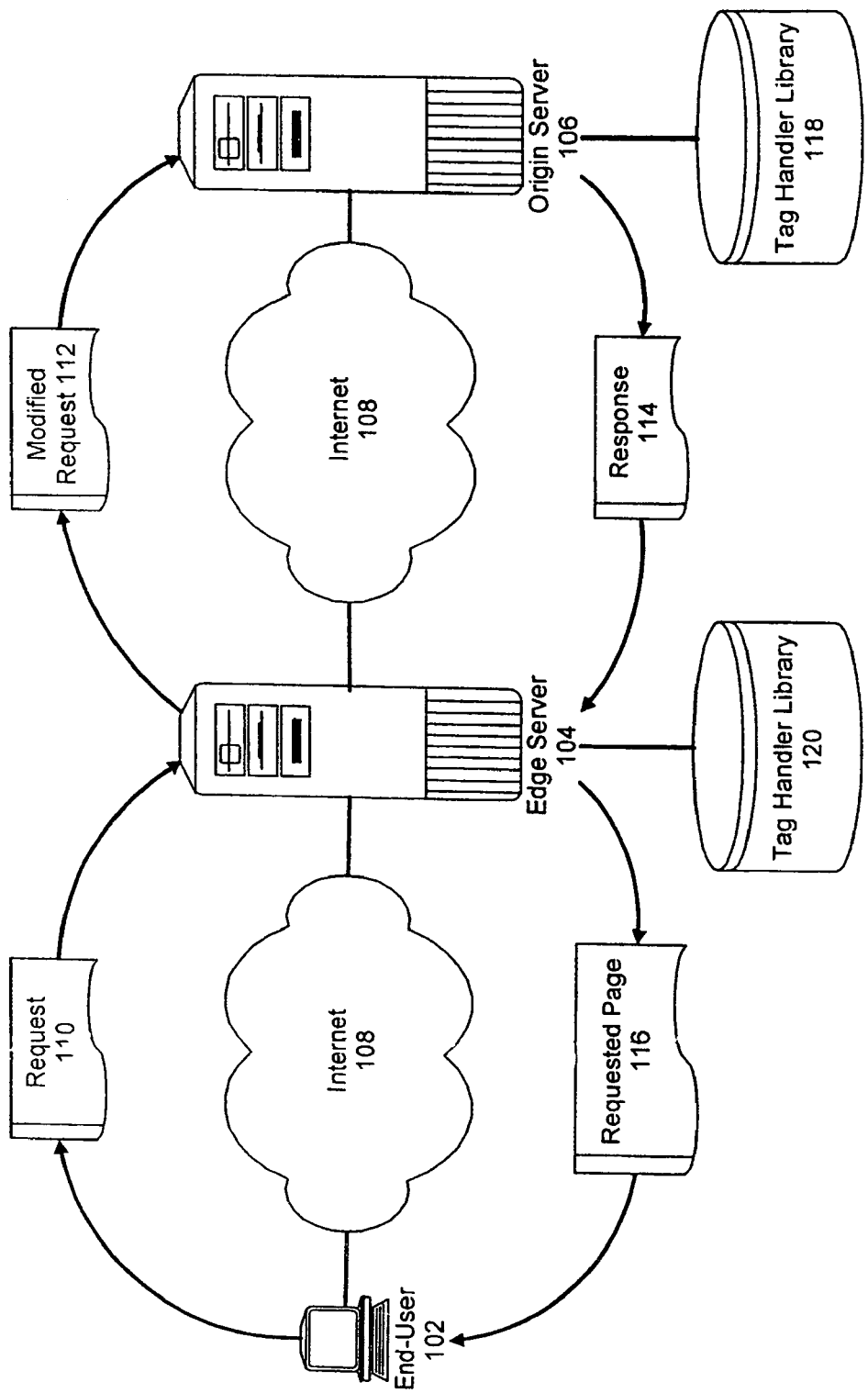
FIG. 1 is a schematic illustration of a system which has been configured to selectively handle requests for dynamic data processing in a computer communications network such as the Internet.

FIG. 1 is a schematic illustration of a system which has been configured to selectively handle requests for dynamic data processing in a computer communications network such as the Internet. The system can include an origin server 106 and one or more edge servers 104 (only a single edge server illustrated), communicatively linked over a computer communications network 108, for example the Internet—albeit any computer communications network can suffice. End-users 102 (only a single end-user illustrated) can access content at the origin server 106 over the computer communications network 108. Notably, the origin server 106 can host simple Web sites, or complex applications. The present invention, however, relates to the distribution of network content which can be dynamically formulated at the time of an end-user request for dynamic data processing.

Importantly, as the end-user 102 typically can be distant from the origin server 106, the system of the invention can include one or more edge servers 104 which can process content requests 110 from the end-user 102 at the edge of the computer communications network 108. More particularly, the edge server 104 can process the requests 110 locally rather than at a distance in the centralized origin server 106. As will be recognized by one skilled in the art, it is known to deploy such an edge server expressly for the purpose of processing requests and serving cached content at the edge of the computer communications network. In consequence, one can avoid retrieving content at a distance from a centralized application server such as the origin server 106 of the present invention.

Significantly, in the present invention, both the origin server 106 and edge servers 104 can process Java server pages (JSPs). As one skilled in the art will recognize, JSPs are network distributable documents which can contain dynamically generated content. Specifically, JSPs are text files which contain a mix of markup such as hypertext markup language (HTML) or extensible markup language (XML) and embedded program logic. A JSP processor can be required to convert JSPs into an operational application and can be included along with a suitable markup server such as a Web server. When invoked by an appropriately formatted request in a uniform resource locator (URL), the JSP processor can load and execute the embedded program logic. The result typically can be the formatting of dynamic user interface elements, or the production of dynamic data. Subsequently, the dynamically produced data can be combined with the markup to form a composite document.

It is well-known in the art that Web page authoring can be simplified by creating and storing programming logic separately from the Web page in one or more tag libraries, each tag library containing one or more tag handlers. The tag handlers each can perform one or more specific operations including the processing and production of dynamic data. Tag handlers can be referenced in the Web page through corresponding tags. The correspondence between a tags and its associated tag handlers can be specified in a tag definition. At run-time, when a tag is encountered, the corresponding tag handler can be invoked as specified by the tag definition.

As will be apparent from the illustration of FIG. 1, the system of the invention can be configured to process markup containing tags which reference tag handlers stored in tag handler libraries 118, 120. Importantly, both the edge server 104 and the origin server 106 can have associated tag handler libraries 118, 120 as each server can process JSPs depending upon the type of tag handler requested and the contents of the server's respective tag handler libraries 118, 120. For instance, while both tag handler libraries 118, 120 may include tag handlers for generating the current time, only the tag handler library 118 of the origin server 106 may include a tag handler for retrieving a stock quote. In any case, the invention is not so limited to the particular types of tag handlers included in the tag handler libraries 118, 120 as any set of tag handlers can suffice.

In operation, the end-user 102 can transmit a request for network content 110, such as a JSP, from the origin server 106. In particular, the request can be an HTTP request. Depending upon the location of the end-user 102 in the computer communications network 108 and the configuration of the system of the present invention, the request 110 can be routed to a selected edge server 104. The edge server 104 can receive the request 110 and can determine if the edge server 104 can wholly process the request 110 without retrieving content from the origin server 106. If so, the edge server 104 simply can respond to the request 110 by returning the requested content 116 to the end-user 102. Otherwise, in accordance with the inventive arrangements, the edge server 104 can "publish" a list of those tags which the edge-server 104 can process by embedding such list in the header of the request 110.

The modified request 112 which can include the published list can be forwarded by the edge server 104 to the origin server 106. Upon receipt, the origin server can retrieve the requested content and can determine therefrom whether any tags contained therein reference tag handlers which can be processed by the edge server 104. If not, the origin server can assemble a response 114 by performing any requested dynamic data processing using its tag handlers in its own tag handler library 118. If the origin server 106 recognizes, however, that the edge server 104 can undertake some or all of the requested dynamic data processing based upon the published list of tags, the origin server 106 can defer the processing of such tags to the edge server 104.

Subsequently, any content produced by the dynamic data processing can be combined with any retrieved content to form the response 114. Once formed, the response 114 can be forwarded to the edge server 114. Once the edge server 104 has received the response 114 from the origin server 106, the edge server 104 can determine from the response 114 whether any tags exist therein which can be processed by tag handlers in the tag handler library 120. If the edge server 104 detects such tags, the edge server 104 can invoke suitable tag handlers for each detected tag. When the invoked tag handlers have completed their respective dynamic data processing, the results produced therefrom can be included in the response 114 in lieu of the tags processed by the edge server 104. The resulting combination can be forwarded to the end-user 102 in the form of the requested content 116.

Figure 2:
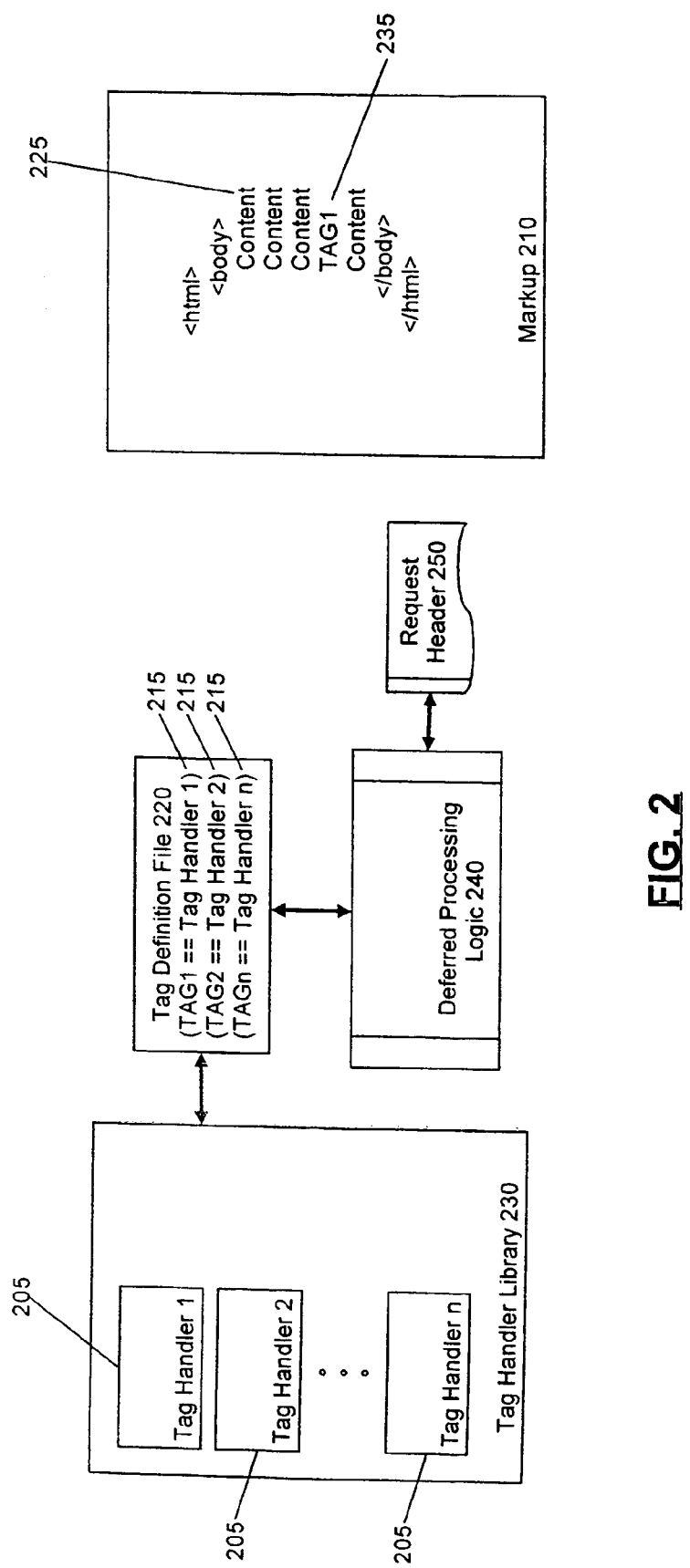
FIG. 2 is a block diagram of a tag definition file, tag handler and deferred processing logic for use in the system of FIG. 1; and, FIGS. 3A and 3B, taken together, are a flow chart illustrating a process for selectively handling requests for dynamic data processing in the system of FIG. 1.

FIG. 2 is a block diagram of a tag definition file 220, tag handler library 230 and deferred processing logic 240 for use in the system of FIG. 1. Both the edge server 104 and origin server 106 of FIG. 1 can include a tag handler library 230 configured as shown in FIG. 2. Specifically, the tag handler library can be a conventional tag handler library which can include one or more tag handlers 205.

Markup 210, such as a JSP or other such suitable document containing dynamically executable scripting language, can include not only static and other types of dynamically generated content 225, but also the markup 210 can include a request for dynamic data processing specified by a tag 235. As would be expected by one skilled in the art, a tag definition file 220 can be included which associates tags such as tag 235 with a corresponding tag handler 205. More particularly, tag definitions 215 can be included in the tag definition file 220, each such tag definition specifying a tag handler 205 and an associated tag 235.

In operation, deferred processing logic 240 in an edge server can receive a request for content. The deferred processing logic 240 can modify the request header to indicate which tags 215 the edge server can process. Subsequently, the edge server can forward the modified request to an origin server. In the origin server, the request header can be examined to identify which tags 215 the edge server can process. The origin server further can produce the requested content, typically in the form of markup 210, but can defer processing of those tags in the markup 210 which the edge server has indicated it can process. Thus, as shown in FIG. 2, the origin processor forward the markup 210 to the edge server with the tag 235 remaining therein. The edge server, in turn, can identify tag 235 in the markup 210 and can invoke execution of the corresponding tag handler 205 in the tag handler library 230 as specified by an associated tag definition 215 in tag definition file 220.

FIGS. 3A and 3B, taken together, are a flow chart illustrating an exemplary process for selectively handling HTTP requests for dynamic data processing in the system of FIG. 1. Importantly, though the invention is not so limited, FIGS. 3A and 3B particularly address a JSP-specific implementation. Beginning in step 302 of FIG. 3A, an edge server 300A can receive an HTTP request. Typically, the request can be included as part of an end-user specified URL such as the exemplary URL www.example.com/index.jsp which requests the content contained in the JSP, "index.jsp". Initially, the request can be routed to the edge server 300A in accordance with the particular network configuration.

In step 304, if the edge server 300A can process the request without requiring the assistance of origin server 300B, the edge server 300A can produce the requested content and return the requested content to the requesting end-user in step 306. Otherwise, in step 308, the edge server 300A can add information to the HTTP request header which indicates that the edge server 300A can process JSP source files containing certain tags or tag libraries. Still, the invention is not limited in regard to the static selection of those tags or tag libraries. Rather, in an alternative aspect of the present invention, tag libraries can be dynamically retrieved by the edge server 300A or deployed to the edge server 300A by the origin server 300B. In any case, the request with the modified header can be forwarded to the origin server 300B in step 310.

In step 312 of FIG. 3B, the request can be received in the origin server 300B. In accordance with the request, the origin server 300B can generate a suitable response, typically by retrieving a request file containing markup. In the present example, the origin server 300B can retrieve "index.jsp". Once the markup has been assembled, the origin server 300B can parse the contents of the markup to determine whether any requests for dynamic server-side data processing are embedded therein. In particular, individual requests for dynamic data processing can be denoted by a custom tag.

Upon encountering a tag indicating a request for dynamic data processing, the origin server 300B, in step 316, can determine whether the edge server 300A can process the request for dynamic data processing. Notably, the origin server 300B can make this determination based upon the information inserted in the HTTP request by the edge server 300A in step 308 of FIG. 3A. If it is determined that the edge server 300A cannot process the tag, in step 318 the origin server 300B can submit the tag to an associated JSP processor which can perform the requested dynamic data processing. In step 320, the result produced by the JSP processor can be inserted in the requested content and in step 324 the content can be returned to the edge server 300A in the form of an HTTP response.

By comparison, if in step 316, it is determined that the edge server 300A can process one or more of the tags in the requested content, the origin server 300B can leave those tags in the requested markup, thereby deferring processing the request for dynamic data processing to the edge server 300A. Notably, the origin server 300B can choose to defer some tag processing to the edge server 300A while processing some tags locally, even though the edge server 300A may be configured also to perform such tag processing.

An example of this type of "staggered processing" can include a situation where a JSP includes a request for the current time and a stock quote. As the stock quote can be delayed by twenty minutes, network latencies do not compel deferred processing of the request for the stock quote. Network latencies could, however, impact the accuracy of the reported time. Hence, the request for the current time can be deferred to the edge server 300A.

Returning now to FIG. 3A, whether or not the origin server 300B has deferred tag processing to the edge server 300A, in step 326 the edge server 300A can receive the response from the origin server 300B. In step 328, the edge server 300A can parse the markup contained in the response and can detect the presence therein of any tags. Alternatively, in one aspect of the invention, the edge server 300A can consult the response header in which the origin server 300B can place a list of tags included in the markup. In any case, if no tags are detected, in step 338 the response can be forwarded to the end-user.

In step 330, however, if tags are detected in the markup, a directive can be added to the markup which directs the local JSP processor to process embedded tags. In the art, such directives are known as "taglib" directives. The invention, however, is not so limited and in an alternative aspect of the invention, the origin server 300B can encode the original taglib directive in the markup. In step 332, the modified markup can be temporarily stored as the requested file, in this example as "index.jsp".

Subsequently, in step 334 the temporarily stored file can be passed to a local application server so that all of the markup, including the requests for dynamic data processing, can be processed in the edge server 300A. Specifically, the local application server can identify the tags in the markup and can invoke corresponding tag handlers as specified in an associated tag definition library. Still, where the edge server itself can perform the duties of an application server, it is not necessary to pass the temporarily stored file to a separate server. In any case, in step 336 the local application server can produce resulting markup which can be forwarded to the end-user in step 338.

Importantly, though not illustrated in FIGS. 3A and 3B, the edge server 300A can cache markup produced in accordance with the inventive arrangements. In this way, when requested contain can be located in a local cache of the edge server 300A, the edge server 300B can respond with the cached content without the assistance of the origin server 300B. Importantly, the edge server 300A can undertake such caching even though the markup may contain content produced dynamically by a tag handler. In such a case, however, the edge server 300A can track the "staleness" of such content and can intelligently determine when to forward HTTP requests for such content to the origin server and when to server requested content from cache memory without assistance from the origin server 300B.

The present invention can be realized in hardware, software, or a combination of hardware and software. A system for selectively deferring processing of requests for dynamic data which has been configured in accordance with the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for selectively handling data processing requests in a computer communications network comprising:

identifying at least one type of dynamic data processing which can be performed in an edge server;

detecting a request for dynamic data processing in a markup language document;

determining whether said edge server can perform said requested dynamic data processing based upon said identified at least one types of dynamic data processing which can be performed in said edge server; and, deferring processing of said request to said edge server in response to the determination that said edge server can perform said requested dynamic data processing.

2. The method of claim 1, further comprising:

generating markup which contains said request for dynamic data processing, encapsulating said markup in a response and forwarding said response to said edge server in response to the determination that said dynamic data processing can be performed in said edge server, wherein said edge server can perform said deferred processing.

3. The method of claim 2, further comprising:

performing said data processing, said data processing producing a result, generating additional markup which contains said result, encapsulating said additional markup in a response and forwarding said response to said edge server in response to the determination that said dynamic data processing cannot be performed in said edge server, wherein said edge server can forward said response to requesting user.

4. The method of claim 1, wherein deferring processing of said request to said edge server in response to the determination that said edge server can perform said requested dynamic data processing comprises:

determining whether it is preferable to defer processing of said request to said edge server; and, deferring processing of said request to said edge server in response to the determination that it is preferable to defer processing of said request to said edge server.

5. A computer program product on a computer readable storage medium the computer program product comprising a computer readable program, wherein the computer readable program when executed on a computer causes the computer to perform:

identifying at least one type of dynamic data processing which can be performed in an edge server;

detecting a request for dynamic data processing in a markup language document;

determining whether said edge server can perform said requested dynamic data processing based upon said identified types of dynamic data processing which can be performed in said edge server; and, deferring processing of said request to said edge server in response to a determination that said edge server can perform said requested dynamic data processing.

6. The computer program product of claim 5, further comprising:

generating markup which contains said request for dynamic data processing, encapsulating said markup in a response and forwarding said response to said edge server in response to the determination that said dynamic data processing can be performed in said edge server, wherein said edge server can perform said deferred processing.

7. The computer program product of claim 6, further comprising:

performing said data processing, said data processing producing a result, generating additional markup which contains said result, encapsulating said additional markup in a response and forwarding said response to said edge serve in response to the determination that said dynamic data processing cannot be performed in said edge serve, wherein said edge server can forward said response to requesting user.

8. The computer program product of claim 5, wherein deferring processing of said request to said edge server in response to the determination that said edge server can perform said requested dynamic data processing comprises:

determining whether it is preferable to defer processing of said request to said edge server; and, deferring processing of said request to said edge server in response to a determination that it is preferable to defer processing of said request to said edge server.

9. A system for selectively processing a request for dynamic data processing in a computer communications network comprising:

a tag handler library comprising a plurality of tag handlers configured to perform dynamic data processing;

a tag definition file comprising a plurality of tag definitions, each said tag definition associating a tag handler with a particular markup language tag;

an application processor configured to process markup language formatted data and to invoke tag handlers corresponding to particular markup language tags detected in said markup language formatted data as specified by tag definitions in said tag definition file; and, deferred processing logic configured to modify a request header to specify which types of dynamic data processing said system can process, said deferred processing logic being further configured to pre-process said markup language formatted data for processing in said application processor.

10. The system of claim 9, wherein said tag handler comprises a Java class.

11. The system of claim 9, wherein said markup language formatted data is a Java Server Page (JSP) and said markup language tag is a customized JSP tag.

12. A method for selectively handling data processing requests in a computer communications network comprising:

receiving in an edge server an HTTP request for a Java Server Page (JSP), said HTTP request comprising an HTTP request header;

modifying said HTTP request header to indicate whether said edge server can process JSP program fragments having particular markup tags;

forwarding said HTTP request comprising said modified HTTP request header to an origin server, said origin server processing said HTTP request by serving said requested JSP, but deferring processing of any of said JSP program fragments in said JSP having said particular markup tags, and returning said requested JSP to said edge server; and, processing deferred ones of said JSP program fragments in said edge server.

13. The method of claim 12, wherein modifying said HTTP request header to indicate whether said edge server can process JSP program fragments having particular markup tags comprises:

determining whether said edge server is configured to process said JSP program fragments having particular markup tags;

configuring said edge server with selected markup tag handlers so that said edge server can process said JSP program fragments in response to the determination that said edge server is not configured to process said JSP program fragments having particular markup tags; and, modifying said HTTP request header to indicate that said edge server can process said JSP program fragments having said particular markup tags.

14. A computer program product on a computer readable storage medium the computer program product comprising a computer readable program, wherein the computer readable program when executed on a computer causes the computer to perform:

receiving in an edge server an HTTP request for a Java Server Page (JSP), said HTTP request comprising an HTTP request header;

modifying said HTTP request header to indicate whether said edge server can process JSP program fragments having particular markup tags;

forwarding said HTTP request comprising said modified HTTP request header to an origin serve, said origin serve processing said HTTP request by sewing said requested JSP, but deferring processing of any of said JSP program fragments in said JSP having said particular markup tags, and returning said requested JSP to said edge server; and, processing deferred ones of said JSP program fragments in said edge server.

15. The computer program product of claim 14, wherein modifying said HTTP request header to indicate whether said edge serve can process said JSP program fragments having particular markup tags comprises:

determining whether said edge server is configured to process JSP program fragments having particular markup tags;

configuring said edge server with selected markup tag handlers so that said edge server can process said JSP program fragments in response to the determination that said edge server is not configured to process JSP program fragments having particular markup tags; and, modifying said HTTP request header to indicate that said edge server can process said JSP program fragments having said particular markup tags.

16. A method for selectively handling data processing requests in a computer communications network comprising:

configuring a tag handler to perform dynamic data processing;

further configuring said tag handler to identify whether a specified edge server can perform said dynamic data processing;

establishing a tag definition corresponding to said tag handler; and, embedding references to said tag definition and said tag handler in network distributable markup.

* * * * *